United States Patent Office 2,824,281
Patented Feb. 18, 1958

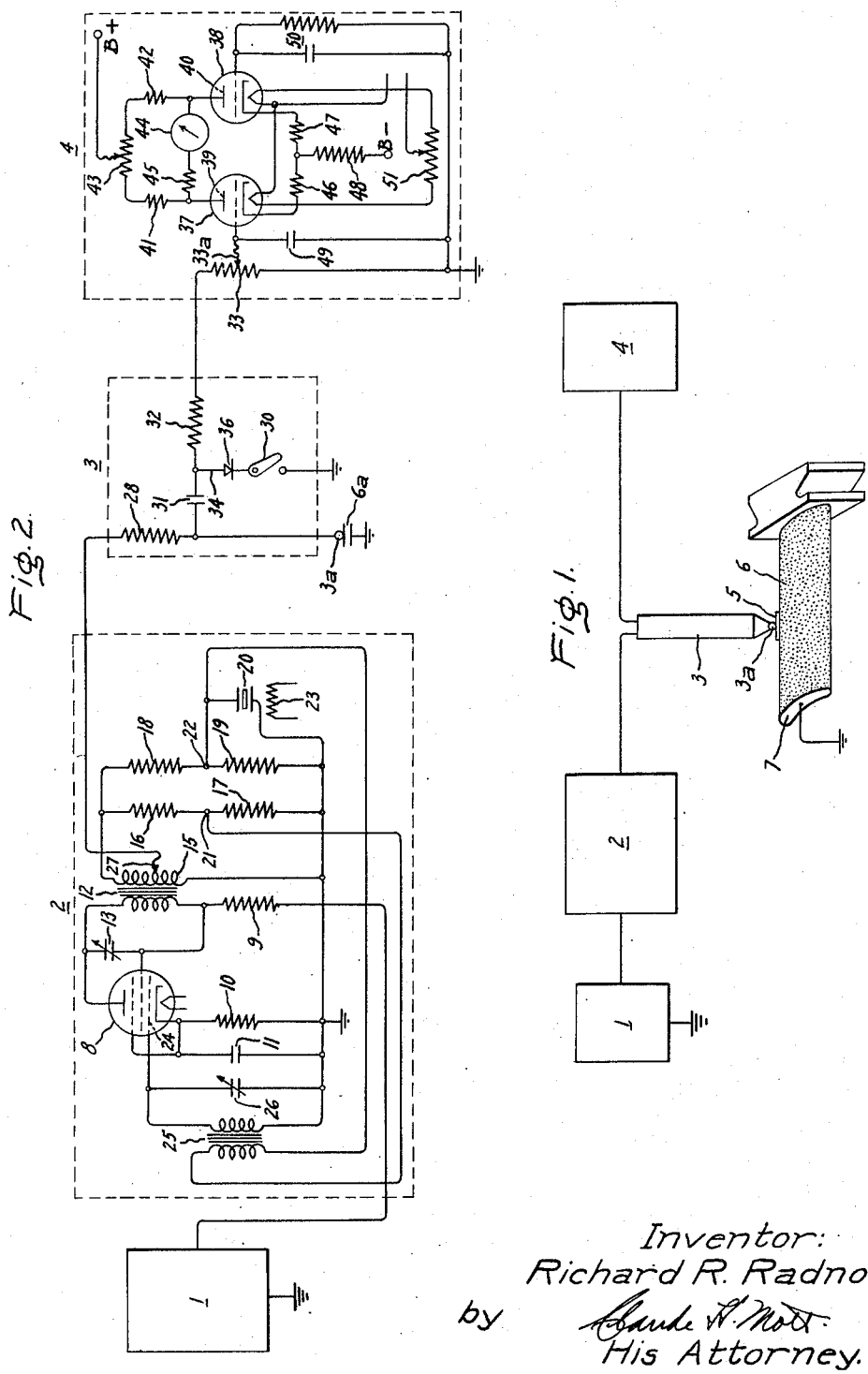

2,824,281

METHOD AND APPARATUS FOR MEASURING THICKNESS

Richard R. Radnor, Lynnfield Center, Mass., assignor to General Electric Company, a corporation of New York Application February 26, 1954, Serial No. 412,783

4 Claims. (Cl. 324—61)

My invention relates to the method of and apparatus for the non-destructive measurement of the thickness of non-conducting coatings applied on conducting metals.

Heretofore, a number of methods have been utilized in measuring the thickness of coatings on the base metal. While the most direct method of such measurement is by the use of a depth micrometer, this method is unsuitable for production testing because it requires the destruction of portions of the coating. A second method which has been used is the employment of a magnetic field. However, this type of measurement can be used only where the coating is applied to a magnetic base metal. Another method for measuring the thickness is based upon measuring the dielectric strength of the coating by the utilization of a probe having a metallic tip. While this method of measurement is satisfactory for some applications, reproducible measurements are difficult to obtain because the measurements depend to a large degree upon the pressure with which the probe is applied to the coating material and to the curvature of the coated base metal. The variation in repeated thickness readings due to probe pressure is especially great where the surface of the coating is rough. It is believed that this roughness variation is due to entrapped air on the surface material beneath the probe. Moreover, since the probe engages only the highest points of the coating surface, it cannot indicate whether or not there are deep pits in the coating which leave the base metal completely uncoated.

Accordingly, it is an object of my invention to overcome the above difficulties by providing a gauge for the non-destructive testing of non-conductive coatings which is independent of probe pressure and the curvature of the coated conductor.

It is another object of my invention to provide an improved method for testing non-conductive coatings on metals.

Still another object of my invention is to provide a method wherein reproducible thickness measurements of a non-conducting coating may be easily obtained regardless of the texture of the coating.

A still further object of my invention is to provide a method for the non-destructive measurement of the thickness of an insulating coating on a base metal which will detect pits in the coating exposing the base metal.

Another object of my invention is to provide novel apparatus for accurately measuring the properties of an insulating coating on a metal base regardless of the surface contour of the metal base.

Further objects and advantages of my invention will become apparent and my invention will be better understood by reference to the following description and the accompanying drawing, and the features of novelty which characterize my invention will be pointed out with particularity in the claims annexed to and forming a part of this specification.

Figure 1 is a block diagram illustrating one form of my invention.

Figure 2 is a schematic diagram of the embodiment of my invention shown in Figure 1.

In accordance with one aspect of my invention, a spot of conducting material of predetermined size is painted over the non-conducting coating on a base metal to form an equivalent capacitor with the coated base metal. A probe having a tip providing a constant-current constant-frequency signal is impressed across the equivalent capacitor and the voltage of the equivalent capacitor is measured. Since the capacitive reactance of a capacitor formed by two parallel plates is proportional to the plate spacing, voltage reading of the capacitor is proportional to the plate spacing and hence to the thickness of the coating. In addition, since the conducting spot contacts all points of the surface of the non-conducting coating which it overlies, any pits in the coating which expose the base metal will be easily detected.

Referring now to Figure 1, there is shown a power supply 1 of any suitable design, as well known in the art, for furnishing the input power for the mechanism. A crystal oscillator 2 of a series resonant type is powered by the power supply 1 and provides a constant frequency signal which is fed into a probe 3. The output of the probe 3 is a D. C. voltage which is measured by a D. C. vacuum tube voltmeter 4 which may be calibrated to indicate the thickness of the non-conducting coating being tested directly.

The probe 3 is provided with a ball tip 3a for contacting a spot 5 of conducting material which overlies in intimate contact the insulation 6 on grounded base metal 7, shown here as a ceramic coated turbine blade providing a surface of varying curvature. The voltage picked up by the probe 3 and measured by the voltmeter 4 is proportional to the capacitive reactance across the equivalent parallel plate capacitor 6a formed by conducting spot 5, non-conducting coating 6, and base metal 7. By properly designing probe 3 and oscillator 2, as hereinafter described, a substantially constant-frequency constant-current voltage is impressed across the equivalent capacitor to produce a measurable D. C. voltage to indicate the thickness of the coating 6.

Turning now to Figure 2, the D. C. output of the power supply is fed into the plate circuit of pentode 8 through a current limiting resistor 9. Pentode 8 is connected to ground through a cathode resistor 10 paralleled with a capacitor 11. The output of tube 8 is connected through a coupling transformer 12 having a primary circuit which may be tuned by tunable condenser 13 to the frequency of oscillation of oscillator 2. One end of the secondary 15 of the transformer is connected to ground and the other end of the transformer is connected to ground through a resistance bridge arrangement having resistors 16, 17, 18 and 19 in its four legs. As shown, resistor 19 is shunted by a crystal such as a quartz crystal 20. If desired, a heater element 23 connected to any suitable source of power (not shown) may be provided in a crystal oven to maintain the crystal at a constant temperature to maintain a constant resonant frequency. At the series resonant frequency of the crystal, the crystal impedance becomes low, unbalancing the bridge to cause an alternating voltage to be set up between points 21 and 22 of the bridge. The alternating voltage developed between points 21 and 22 of the bridge circuit is transformer coupled to the control grid 24 of pentode 8 through transformer 25. A tunable condenser 26 across the secondary of coupling transformer 25 is provided so that the secondary circuit may be tuned to the oscillatory frequency of the oscillator 2.

A portion of the output signal of tube 8 is fed into probe 3 by means of a connection 27 to a point intermediate the ends of the secondary 15 of output transformer 12. This A. C. signal is connected to probe tip 3a through a resistor 28. The size of the resistor 28 is made very large with respect to the capacitive reactance of any coating to be measured so that the resistance of the circuit (hence, the current through the circuit) is substantially unchanged when equivalent capacitor 6a is added to the circuit.

The A. C. voltage across equivalent capacitor 6a is connected to charge capacitor 31 to substantially the peak value thereof. Capacitor 31 discharges through a resistor 32 and a calibrating resistor 33 of the voltmeter 4 which provides a long time constant. Connected between capacitor 31 and resistor 32 is a lead 34 which is grounded to the case of the probe through a rectifier 36. When switch 30 is closed, rectifier 36 provides a low resistance circuit through capacitor 31 during one-half cycle of the impressed A. C. voltage to maintain a substantially constant D. C. voltage across capacitor 31 having very little ripple.

Voltmeter 4 consists of a pair of triodes (or a dual triode) 37 and 38 having plates 39 and 40 respectively, connected to B+ voltage through plate resistors 41 and 42 respectively, and zero adjusting resistor 43. A voltage measuring circuit is connected directly between plates 39 and 40 to measure the voltage difference therebetween and consists of a meter 44 and a current limiting series resistor 45.

The cathodes of triodes 37 and 38 are connected to the B— voltage through cathode resistors 46 and 47 and common resistor 48.

The control grid of triode 37 is connected to calibrating resistor 33 and is provided with a capacitor 49 to bypass the slight ripple of the D. C. current from capacitor 31. The grid circuit of tube 38 consists of a parallel resistance-capacitance coupling 50 to ground. The filaments of the triodes 37 and 38 are parallel connected to a suitable source of filament voltage (not shown) and the filament circuit is provided with an adjusting resistor 51 to equalize the emission of tubes 37 and 38 so that changes in filament voltage will not cause an appreciable change in meter balance.

In order to obtain the objectives of my invention, a spot or dot of predetermined size of a conducting material which closely conforms to the surface irregularities of the coating being measured is applied to the coated specimen 7 to form a plate of an equivalent capacitor 6a as shown in Figure 2. While this layer of conducting material may be of any type which meets the above requirements, a water-soluble metallic or graphite conducting paint is preferred because it may be easily removed from the coated specimen when the tests are completed. It is important that any grease film or foreign matter on the coating 6 be removed prior to the application of the dot 5 because such foreign matter will produce inaccuracies in the measurements. The dot may be made of the desired size in any suitable matter and preferably be applied by the use of a template which masks the area to be left uncovered.

A conducting layer such as a conducting paint will easily indicate any pits in the non-conducting coating because the pits therein will expose the base metal and produce a short circuit during the test. Additionally, because a painted spot will contact both the high and low portions of the surface areas which it overlies, air can not be entrapped thereunder to change the indicated thickness measurement. Since the air has a different dielectric constant than the non-conducting coating being measured, this eliminates a possible source of large error.

Referring again to Figure 2, it will be noted that means are provided for the calibration of the meter 44 so that the readings may be made directly in terms of the thickness of the non-conducting coating 6. This means comprises an adjustable slider 33a on a calibrating resistor 33 across which the D. C. signal representing the thickness of the non-conducting coating is impressed. Since the dielectric constant of the coating is different for different materials, or for the same material made in a different manner, the voltmeter circuit is preferably calibrated by reference to a sample having the selected coating of a known thickness.

Because some types of non-insulating coatings, such as certain ceramics, contain particles of metals such as chromium which may accidentally line up to form conducting chains from the base metal to the surface of the coating, or thin threads of an oxide of the base metal may reach the surface of the ceramic coating, it is desirable to measure the resistance between the conducting spot and the base metal to determine the existence of such conducting chains or threads. It has been found that such conducting chains or threads, if found to exist, may be eliminated for an interval of time ranging from a few minutes to a day by the application of a momentary voltage of the order of 20–25 volts between the painted spot 6 and the base metal 7 with the negative terminal connected to the painted spot. In the event that this does not increase the resistance across the non-conducting coating to a value greater than 5000 ohms for coatings of thicknesses on the order of .001 inch, pits in the non-conducting coating are exposing the base metal.

The balancing resistor 51 in the filament circuit of the triodes 37 and 38 of the voltmeter makes it possible to balance the emission of the triodes 37 and 38. If, however, upon replacing a tube the balancing resistor 51 cannot equalize the emission of triodes 37 and 38, the zero adjustment of the instrument may be accomplished by means of balancing resistor 43 in the B+ supply of the tubes.

The operation of the instrument is as follows: After the voltmeter is calibrated for the dielectric constant of the particular coating under test and the meter has been zeroed, the tip of the probe 3 is placed in contact with conducting spot 5 to apply a constant-frequency voltage across the equivalent capacitor 6a. Because of the large size of resistor 28 as compared to the impedance of the equivalent capacitor 6a, the current flowing through resistor 28 is substantially unchanged by the path to ground through equivalent capacitor 6a. When switch 30 is closed, a D. C. voltage is impressed across calibrating resistor 33. This signal raises the voltage of the grid of triode 37 and increases the conduction of triode 37 to produce a potential difference between the plate of tube 37 and triode 38 which is indicated on meter 44. It will be noted that since resistor 48 is in the cathode circuit of both triodes 37 and 38, the voltage drop thereacross will be increased as the conduction through triode 37 is increased, which is equivalent to raising the cathode voltage of triode 38. Since this reduces the emission of triode 38, an added amplification of the signal impressed on the voltmeter circuit results therefrom.

From the foregoing it is apparent that my invention, which utilizes a conducting spot on a non-insulating coating, eliminates inaccuracies resulting from variation in probe pressure and the curvature of the base metal, and further eliminates inaccuracies resulting from a change in the dielectric strength of the non-conducting coating caused by entrapped air under the probe. Further, it is apparent that the conducting spot produces a precise equivalent parallel plate condenser irrespective of the contours of the coated base metal.

While I have illustrated and described a particular embodiment of this invention, further modifications and improvements thereof will occur to those skilled in the art. I desire it to be understood, therefore, that this invention is not to be limited to the specific embodiment shown and I intend in the appended claims to cover all modifications thereof which do not depart from the spirit and scope of this invention.

What I claim as new and desire to secure by Letters Patent of the United States is:

1. The method of measuring the thickness of a non-conducting coating over a conducting base comprising the steps of painting a spot of soluble conducting material of predetermined size over said coating to form an equivalent parallel plate capacitor and impressing a constant-current, constant-frequency voltage thereacross to obtain a signal proportional to the capacitance of said equivalent capacitor, and impressing said signal on a voltmeter to obtain a reading proportional to the thickness of the coating.

2. The method of non-destructive testing of a non-conducting coating on a conducting base comprising the steps of applying a spot of water soluble conducting paint over a portion of said coating to form an equivalent capacitor, measuring the resistance between said conducting spot and said base metal, applying a relatively high voltage to burn out any conducting paths through said non-conducting coating, applying a constant-current, constant-frequency voltage across said equivalent capacitor to obtain an alternating current signal proportional to the capacitive reactance of said equivalent capacitor, and impressing said signal on a voltmeter to obtain a reading proportional to the thickness of the coating.

3. A gauge for measuring the thickness of a thin non-conducting coating applied over a conducting base and having a spot of conducting paint of predetermined size applied thereon to form with said conducting base an equivalent parallel plate capacitor, comprising oscillator means for providing a source of constant frequency oscillations, probe means connected to the output of said oscillator means and including a voltage supply circuit having a terminal for contacting the conducting spot to apply a constant frequency voltage across the equivalent capacitor, the voltage supply circuit of said probe means providing a resistor which is large in size as compared to the impedance of the equivalent capacitor so that the current passing through the resistor is substantially unchanged when the voltage supply circuit is connected to pass current serially through the resistor and the equivalent capacitor, and voltmeter means having its input connected across the equivalent capacitor to receive the signal across the equivalent capacitor to indicate a voltage proportional to the thickness of the coating.

4. A gauge as recited in claim 3 wherein said voltmeter input circuit includes a coupling capacitor and a resistor in series therewith and a halfwave rectifier connected across the equivalent capacitor on the output side of the coupling capacitor to produce a substantially constant D. C. input signal for said voltmeter proportional to the thickness of said coating.

References Cited in the file of this patent

UNITED STATES PATENTS

| | | |
|---|---|---|
| 2,283,086 | Oliphant | May 12, 1942 |
| 2,507,324 | Taborsky | May 9, 1950 |
| 2,572,597 | Connor | Oct. 23, 1951 |
| 2,616,068 | McDonald | Oct. 28, 1952 |